(12) United States Patent
Qiu

(10) Patent No.: US 11,899,195 B2
(45) Date of Patent: Feb. 13, 2024

(54) INFORMATION TECHNOLOGY BASED ASTRONOMICAL TELESCOPE SYSTEM

(71) Applicant: LIGHT SPEED VISION (BEIJING) CO., LTD., Beijing (CN)

(72) Inventor: Hongyun Qiu, Beijing (CN)

(73) Assignee: LIGHT SPEED VISION (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/668,070

(22) Filed: Feb. 9, 2022

(65) Prior Publication Data

US 2022/0269063 A1    Aug. 25, 2022

(30) Foreign Application Priority Data

Feb. 10, 2021  (CN) .......................... 202110185334.0

(51) Int. Cl.
   *G02B 23/12*    (2006.01)
   *G02B 7/02*     (2021.01)
(52) U.S. Cl.
   CPC .............. *G02B 23/12* (2013.01); *G02B 7/02* (2013.01)
(58) Field of Classification Search
   CPC ................................ G02B 23/12; G02B 7/02
   USPC .......................... 359/399, 402, 425, 432, 421
   See application file for complete search history.

(56) References Cited

U.S. PATENT DOCUMENTS

| 4,266,873 A * | 5/1981 | Hacskaylo | G02B 23/10 42/114 |
| 2018/0227503 A1 * | 8/2018 | Ando | G01J 5/0803 |
| 2019/0196173 A1 * | 6/2019 | Malvache | G09B 27/04 |

* cited by examiner

*Primary Examiner* — William R Alexander
*Assistant Examiner* — Sharrief I Broome
(74) *Attorney, Agent, or Firm* — HAUPTMAN HAM, LLP

(57) ABSTRACT

An IT-based astronomical telescope system comprises a rotatable lens barrel having an eyepiece installed thereon; a detection device for detecting a current orientation of the lens barrel; and an image generator comprising a micro display provided in the lens barrel. The image generator is used to obtain a picture and display the picture on the micro display. The IT-based astronomical telescope system is configured to work in a virtual reality mode, in which: the image generator is turned on, and based on the current orientation of the lens barrel detected by the detection device, obtains a picture corresponding to an optical image of stars supposed to be imaged by the telescope system with the current orientation of the lens barrel; and the micro display displays the picture, which is presented through the eyepiece.

18 Claims, 7 Drawing Sheets

INFORMATION TECHNOLOGY BASED ASTRONOMICAL TELESCOPE SYSTEM

TECHNICAL FIELD

The present disclosure relates to the technical field of precision instruments, in particular to an IT (Information Technology) based astronomical telescope system.

BACKGROUND

An astronomical telescope is a tool for human beings to explore the starry sky. In recent years, with development and progress of science and technology, more and more amateur astronomers observe stars with astronomical telescopes.

However, adjustment of astronomical telescopes is difficult, which requires users to repeatedly practice to aim at the stars in the night sky to learn the adjustment. Due to urban lights or air pollution, to observe the stars in the night sky clearly, one may have to drive to suburbs far away from the city. This makes it inconvenient for amateur astronomers to study and use astronomical telescopes to observe the stars in the night sky.

Thus, there is a need for astronomical telescopes that can make it easy for amateur astronomers to study and use.

SUMMARY

An IT-based astronomical telescope system comprises a rotatable lens barrel having an eyepiece installed thereon; a detection device for detecting a current orientation of the lens barrel; and an image generator comprising a micro display provided in the lens barrel, wherein the image generator is used to obtain a picture and display the picture on the micro display, wherein the IT-based astronomical telescope system is configured to work in a virtual reality mode, in which: the image generator is turned on, and based on the current orientation of the lens barrel detected by the detection device, obtains a picture which is corresponding to an optical image of stars supposed to be imaged by the IT-based astronomical telescope system with the current orientation of the lens barrel; and the micro display displays the picture, which is presented through the eyepiece of the IT-based astronomical telescope system with the current orientation of the lens barrel.

The IT-based astronomical telescope system according to the present disclosure allows users to practice "observing stars" no matter whether the actual conditions is good or bad for observation, which is convenient for users to learn and use.

BRIEF DESCRIPTION OF THE DRAWINGS

Other features, objects and advantages of the present disclosure will become more apparent by reading detailed description of non-limiting embodiments with reference to following figures.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Figure 1:
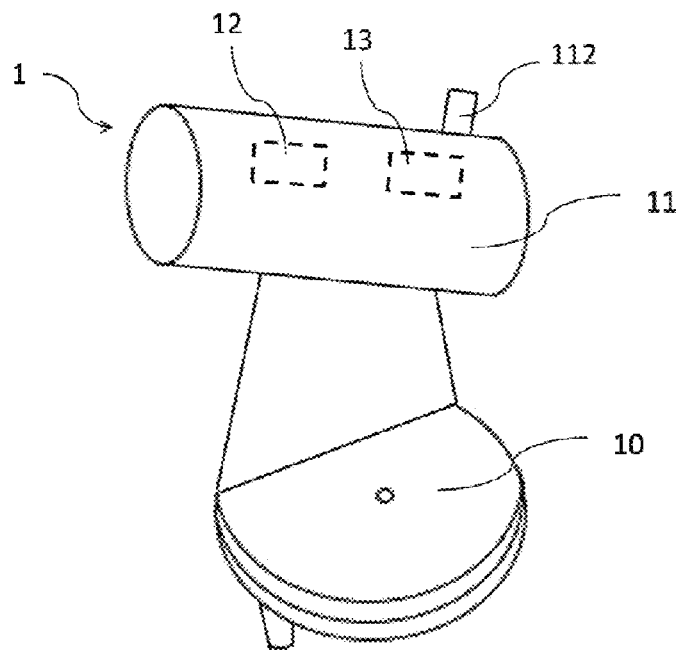
FIG. 1 is an exemplary view of an IT-based astronomical telescope system.

FIG. 1 is an exemplary view of an IT-based astronomical telescope system. As shown in FIG. 1, the IT-based astronomical telescope system, generally indicated with reference numeral 1, comprises a support 10 and a lens barrel 11 rotatably mounted on the support 10. The lens barrel 11 has an eyepiece 112 mounted thereon. Orientation of the lens barrel 11 can be adjusted through the support 10. The IT-based astronomical telescope system 1 further comprises a detection device 12 used to detect a current orientation of the lens barrel 11, and an image generator 13. The image generator 13 comprises a micro display 211 (see FIG. 2). Based on the current orientation of the lens barrel 11 detected by the detection device 12, the image generator 13 obtains a picture corresponding to an optical image of stars that is supposed to be imaged by the IT-based astronomical telescope system 1 with the current orientation of the lens barrel 11. The micro display 211 displays the picture. The detection device 12 and the image generator 13 can be provided in the lens barrel 11 as shown in FIG. 1. However, this is only exemplary, and in other cases, the detection device 12 and/or the image generator 13 can be provided at least partially outside the lens barrel 11. The detection device 12 may include but not be limited to INS (Inertial Navigation System). The image generator 13 may further comprise a processor.

The IT-based astronomical telescope system 1 may comprise a local astronomical information database, and/or be connected to an astronomical information database through a network, and pictures of stars in the entire sky coverage or part of it can be stored in such astronomical information database(s). The image generator 13 can obtain a picture that is corresponding to an optical image supposed to be imaged by the astronomical telescope system 1 in the current orientation of the lens barrel 11 from the astronomical information database. The image generator 13 may carry out processing such as zooming and registering of the picture, based on parameters of the picture and parameters (for example, magnification) of the IT-based astronomical telescope system 1, to make the picture being of the same field of view as the optical image of stars supposed to be imaged by the telescope system 1. In other words, the IT-based astronomical telescope system 1 can work in a virtual reality mode. That is, the IT-based astronomical telescope system 1 can obtain an existing picture of stars corresponding to an optical image supposed to be imaged with a current orientation of the lens barrel of the telescope system 1 and simulate a scene of observing stars as if it is real. The IT-based astronomical telescope system 1 may be used in this mode when, for example, it is not allowed to observe stars due to environmental conditions, such as in daytime or cloudy day.

The IT-based astronomical telescope system 1 allows user to experience as if he/she is really observing celestial bodies through a telescope, no matter how conditions are. Therefore, the IT-based astronomical telescope system 1 of the invention provides a convenient way for users to learn and practice how to use an astronomical telescope.

Figure 2:
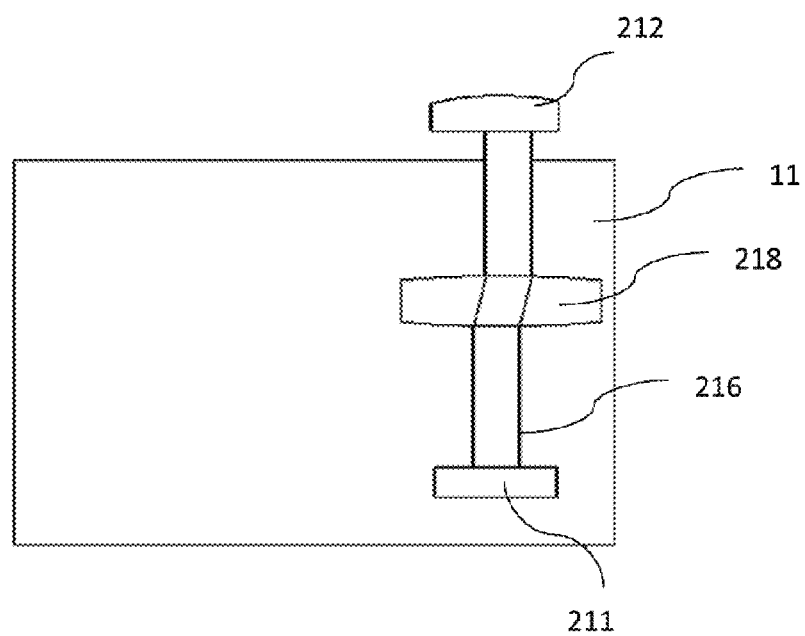
FIG. 2 is an illustration of an IT-based astronomical telescope system according to a first embodiment, showing an optical imaging path in a virtual reality mode.

FIG. 2 is an illustration of an IT-based astronomical telescope system according to a first embodiment, showing an optical imaging path in the virtual reality mode. For clarity and conciseness, only configuration of the lens barrel 11 is shown in the figure. As shown in FIG. 2, the micro display 211 of the image generator 13 is provided in the lens barrel 11, and pictures displayed on the micro display 211 are presented to a user through a first relay lens 218 and an eyepiece 212.

In the first embodiment, the image generator 13 can be connected to a local astronomical information database of the IT-based astronomical telescope system 1, connected to an astronomical information database via Internet, and/or connected with another astronomical telescope on-line. With the IT-based astronomical telescope system 1 of the first embodiment, scenes of observing the sky with stars through an astronomical telescope can be simulated, by obtaining a picture of stars that is corresponding to a current orientation of the lens barrel 11 from the local astronomical information database, the astronomical information database connected via Internet, and/or another astronomical telescope connected with the IT-based astronomical telescope system 1 and presenting the picture to a user through the eyepiece 112.

It can be seen from the above that, the IT-based astronomical telescope system 1 of the first embodiment can work in a virtual reality mode, in which, an existing picture of star that is corresponding to the current orientation of the lens barrel 11 can be displayed on the micro display 211 and thus presented to a user, for example with the same field of view as that of the optical image of stars supposed to imaged by the IT-based astronomical telescope system 1. FIG. 2 shows the optical imaging path 216 used in the virtual reality mode. As shown in FIG. 2, the picture displayed on the micro display 211 is presented to a user through the first relay lens 218 and the eyepiece 212. In the virtual reality mode, only the picture displayed on the micro display 212 can be observed by the user through the eyepiece 212.

The IT-based astronomical telescope system 1 according to the first embodiment can be implemented as a teaching model without an objective lens. In such a case, the image generator 13 may only operate to obtain and display a picture that is corresponding to the optical image of stars supposed to be imaged by an astronomical telescope with the current orientation of the lens barrel 11 from an astronomical information database or another astronomical telescope connected with the IT-based astronomical telescope system 1. It is not necessary for the image generator 13 to carry out subsequent processing, such as zooming, registering of the picture obtained, so as to achieve matching of the field of view.

Working principle of the virtual reality mode of the IT-based astronomical telescope system 1 of the first embodiment will be introduced in more details below with reference to FIG. 3.

Figure 3:
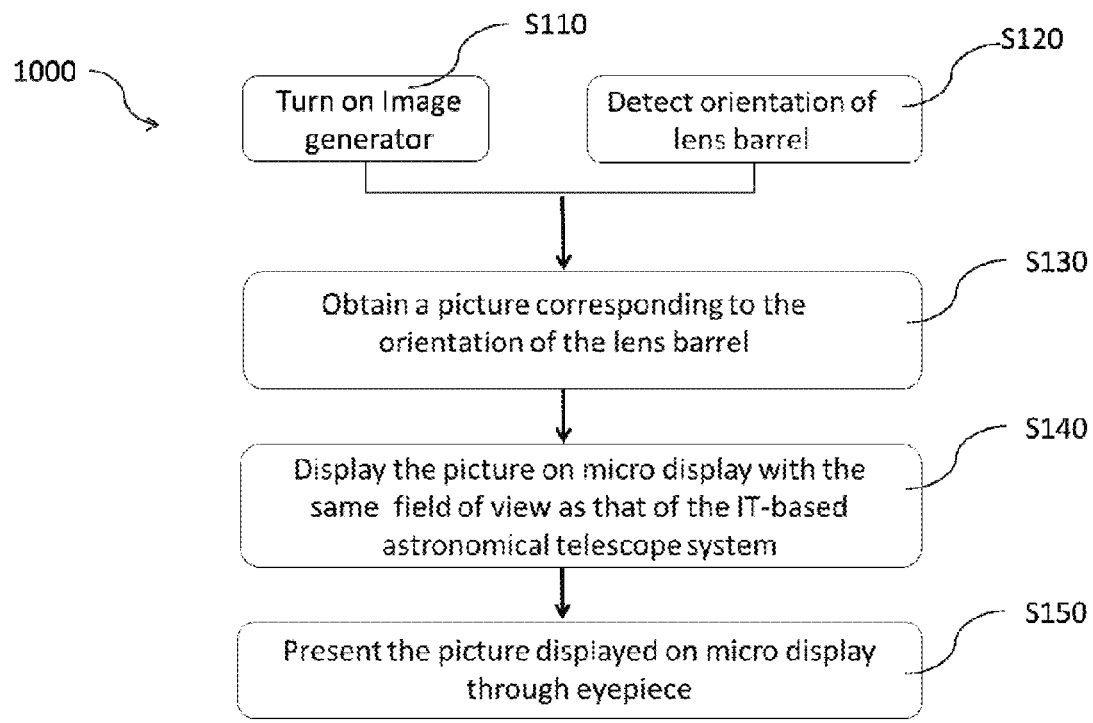
FIG. 3 is a diagram showing working principle of the virtual reality mode of the IT-based astronomical telescope system shown in FIG. 2.

FIG. 3 is a diagram showing working principle of the virtual reality mode of the IT-based astronomical telescope system 1 shown in FIG. 2. As shown in FIG. 3, the diagram showing working principle of the virtual reality mode, which is generally indicated with reference numeral 1000, comprises blocks/processing S110, S120, S130, S140 and S150. In processing S110, the image generator 13 is turned on, so that the image generator 13 is in an operating state, and the micro display 211 of the image generator 13 is enabled to display an image. In processing S120, the detection device 12 detects a current orientation of the lens barrel 11, which, depending on a coordinate system used by IT-based astronomical telescope system 1, may comprise an azimuth angle and a pitch angle of the lens barrel 11 or telescope system 1. A longitude and a latitude of the lens barrel 11 or telescope system 1 can be detected by the detection device 12 or be otherwise obtained and provided to the image generator 13, for example, by using GPS. Processing S110 and S120 may be performed simultaneously or in sequence. After processing S110 and S120, processing S130 is performed. In processing S130, based on the orientation of the lens barrel 11 detected by the detection device 12, the image generator 13 obtains a picture of stars corresponding to the current orientation of the lens barrel 11 from an astronomical information database or another astronomical telescope communicated with the IT-based astronomical telescope system 1. Then in processing S140, the image generator 13 processes the picture obtained in processing S130 based on parameters of the IT-based astronomical telescope system 1 and parameters of the picture, so as to display the picture on the micro display 211 with the same field of view as an optical image of stars that is supposed to be imaged by the IT-based astronomical telescope system 1 with the current orient of the lens barrel 11. It is as if the IT-based astronomical telescope system 1 is really being used to image/observe stars with the current orientation of the lens barrel 11. Finally, in processing S150, the picture is displayed on the micro display 211 and is presented to a user through the relay lens 213 and the eyepiece 212, so that the user can experience as if he/she is observing stars through a telescope. This provides a convenient way for a user to learn and practice how to use an astronomical telescope and to get familiar with the process of observing stars.

Figure 4:
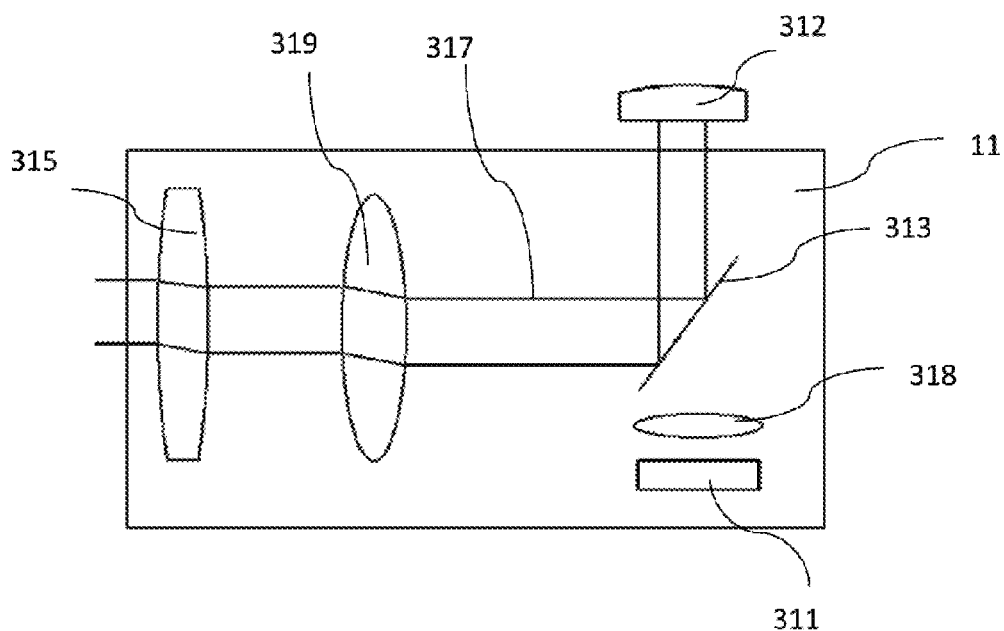
FIG. 4 is an illustration of an IT-based astronomical telescope system according to a second embodiment, showing an optical imaging path in an optical imaging mode.

FIG. 4 is an illustration of an IT-based astronomical telescope system according to a second embodiment. For clarity and conciseness, only configuration of the lens barrel 11 is shown. As shown in FIG. 4, the lens barrel 11 comprises a micro display 311 (which is a part of the image generator 13 shown in FIG. 1), a first relay lens 318, an objective lens 315, a second relay lens 319, a light combining element 313 and an eyepiece 312. In the example shown in FIG. 4, the light combining element 313 is a semi transparent and semi reflective mirror. A picture displayed on the micro display 311 is presented to a user through the first relay lens 318 and the eyepiece 312. An optical image imaged by the objective lens 315 is presented to the user through the second relay lens 319, the mirror 313 and the eyepiece 312.

FIG. 4 illustrates an optical imaging path 317 used in the optical imaging mode of the IT-based astronomical telescope system 1 according to the second embodiment. In the optical imaging mode, the micro display 311 may be turned off so as not to display, and an optical image of stars which the lens barrel 11 is oriented toward, is obtained through the objective lens 315, the second relay lens 319, the mirror 313 and the eyepiece 312 and presented to a user. In the optical imaging mode, only the optical image of stars which the lens barrel 11 is oriented toward can be seen by the user through the eyepiece 312.

According to the second embodiment, the IT-based astronomical telescope system 1 can also work in a virtual reality mode, which can be the same as or similar to that described in the first embodiment. When the image generator 13 is turned on and the micro display 311 displays a picture, but the IT-based astronomical telescope system 1 is in an environment, such as a dark room, and cannot provide a visible optical image, the IT-based astronomical telescope system 1 can be switched to the virtual reality mode.

Working principle of the optical imaging mode of the second embodiment will be described below with reference to FIG. 5.

Figure 5:
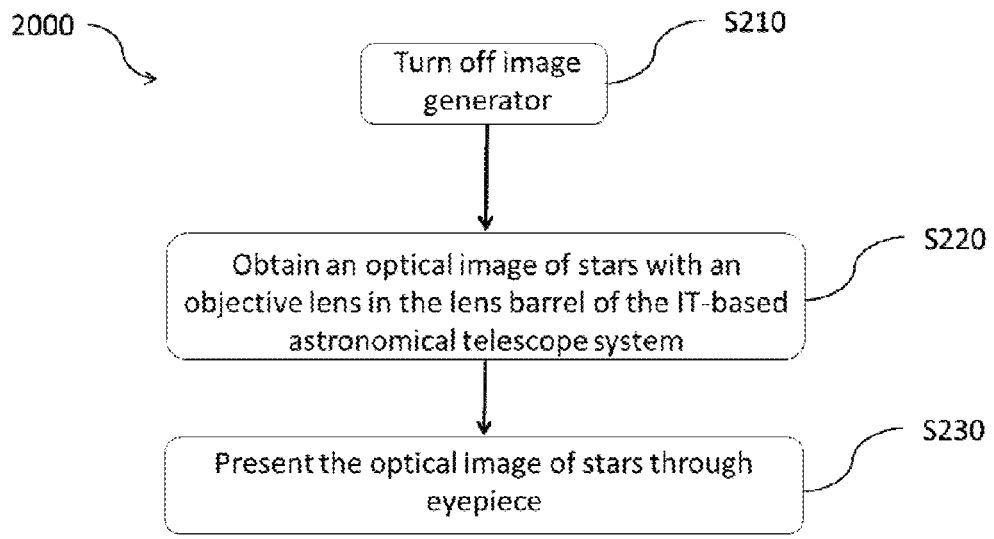
FIG. 5 is a diagram showing working principle of the optical imaging mode of the IT-based astronomical telescope system shown in FIG. 4.

FIG. 5 is a diagram showing working principle of the optical imaging mode of the IT-based astronomical telescope system shown in FIG. 4. As shown in FIG. 5, the diagram showing working principle of the optical imaging mode, which is generally indicated with reference numeral 2000, comprises blocks S210, S220 and S230. In block S210, the image generator 13 is turned off so that the image generator 13 is in a state in which at least the micro display 311 does not display an image. In block S220, an optical image of stars which the lens barrel 11 is oriented toward, is imaged by the IT-based astronomical telescope system 1 through the objective lens 315, the second relay lens 319, the mirror 313 and the eyepiece 312. If it is in the daytime, an optical image of a distant object, toward which the lens barrel 11 is oriented, can be imaged as an alternative. Then, in block S230, the user observes the optical image through the eyepiece 312. This result is the same as that of observing stars with traditional astronomical telescopes.

Figure 6:
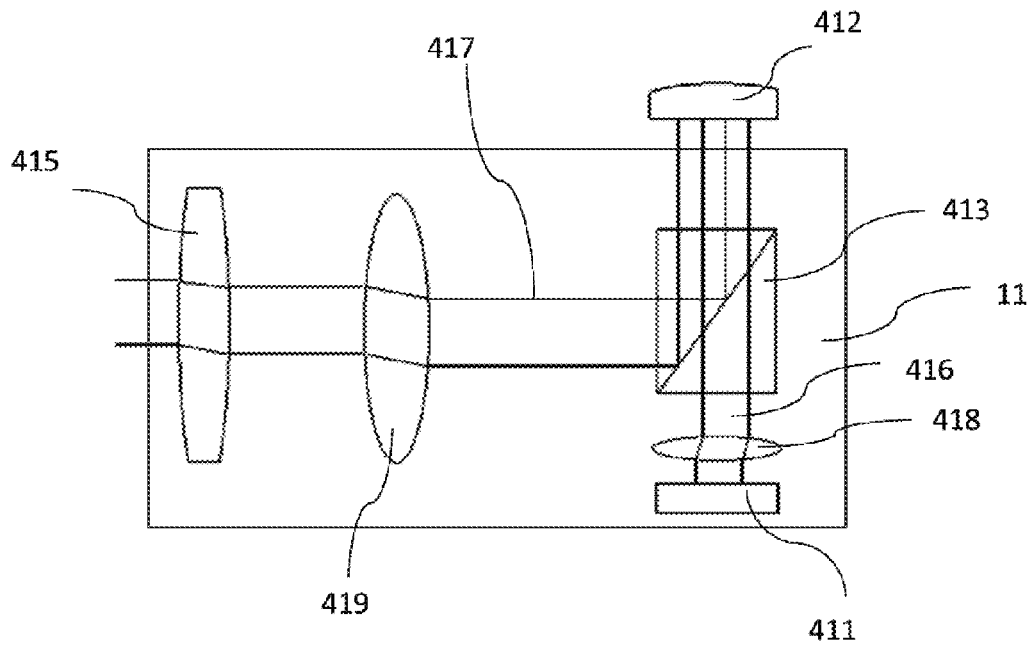
FIG. 6 is an illustration of an IT-based astronomical telescope system according to a third embodiment, showing optical imaging paths in a hybrid image mode.

FIG. 6 is an illustration of an IT-based astronomical telescope system according to a third embodiment, showing optical imaging paths in a hybrid image mode. For clarity and conciseness, only configuration of a lens barrel 11 is shown. As shown in FIG. 6, the lens barrel 11 comprises a micro display 411 (which is a part of an image generator 13 shown in FIG. 1), a first relay lens 418, an objective lens 415, a second relay lens 419, an eyepiece 412, and a light combining element 413. The light combining element 413 may be a light combining prism, for example, a dichroic prism. An optical image of a picture displayed by the micro display 411, which is imaged through the first relay lens 418, and an optical image of stars, which is imaged through the objective lens 415 and the second relay lens 419, can be superposed on each other by the light combining element 413 and then presented to a user through the eyepiece 412.

FIG. 6 shows an optical imaging path 416, along which the picture displayed on the micro display 412 is imaged through the first relay lens 418, the light combining element 413 and the eyepiece 412, and an optical imaging path 417, along which stars are imaged through the objective lens 415, the second relay lens 419, the light combining element 413 and the eyepiece 412. Accordingly, FIG. 6 shows an optical path for superposing the optical image of the stars and the optical image of the picture displayed on the micro display 411, which is the optical imaging path of the hybrid image mode of the IT-based astronomical telescope system 1.

Figure 7:
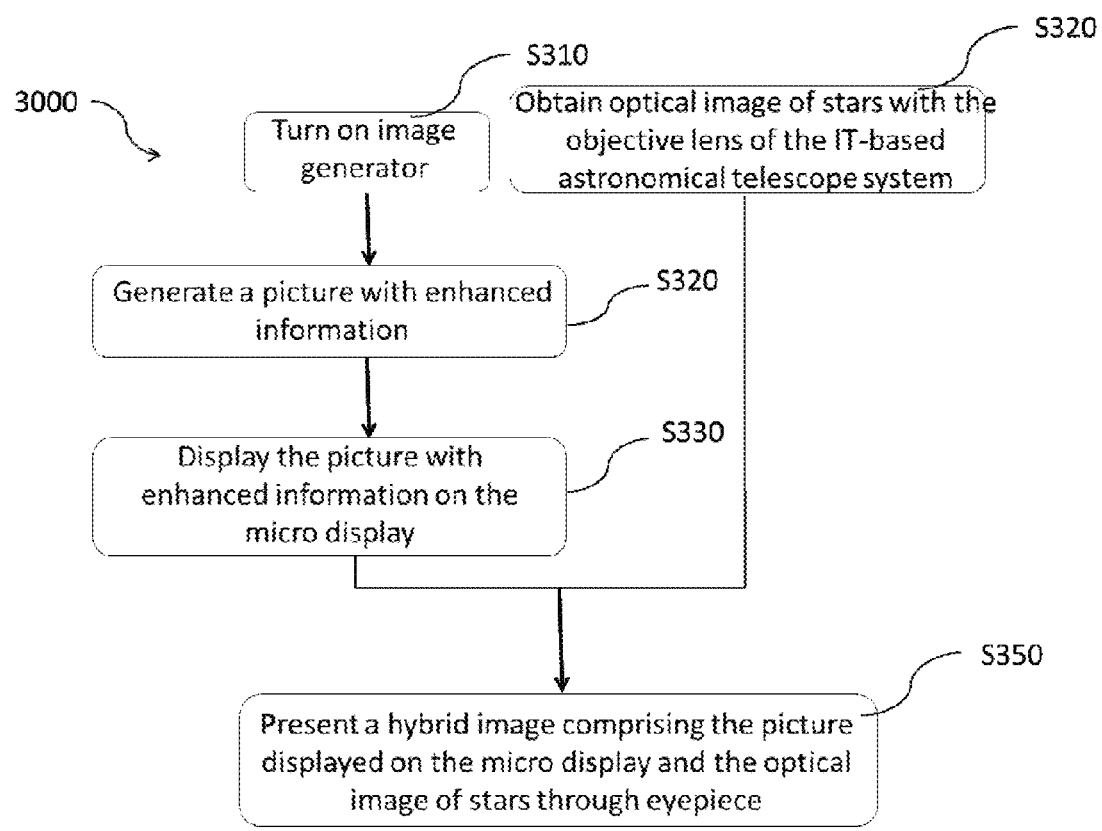
FIG. 7 is a diagram showing working principle of the hybrid image mode of the IT-based astronomical telescope system shown in FIG. 6.

FIG. 7 is a diagram showing working principle of the hybrid image mode of the IT-based astronomical telescope system shown in FIG. 6. As shown in FIG. 7, the diagram showing working principle of the hybrid image mode, which is generally indicated with reference number 3000, comprises blocks/processing S310, S320, S330, S340 and S350. In processing S310, the image generator 13 is turned on so that the image generator 13 is in a working state and at least the micro display 411 is enabled to display images. In processing S320, an optical image of stars which the lens barrel 11 is oriented toward, is imaged through the objective lens 415, the second relay lens 419, the light combining element 413 and the eyepiece 412 of the IT-based astronomical telescope system 1. If it is in daytime, an optical image of a distant object which the lens barrel 11 is oriented toward, can be imaged as an alternative. Then in processing S330, the image generator 13 generates a relevant picture with enhanced information based on the orientation of the lens barrel 11, and/or based on an optical image of the IT-based astronomical telescope system 1. Next, in processing S340, the picture with enhancement information generated by the image generator 13 is displayed on the micro display 411 of the image generator 13. Finally, in processing S350, a hybrid image obtained by superposing the picture displayed on the micro display 411 and the optical image of real stars is presented to the user through the eyepiece 412.

The picture with enhanced information can be a picture with, for example, information for guiding the adjustment of the IT-based astronomical telescope system 1, information related to stars in the optical image, and/or other astronomical knowledge. Also, the picture with enhanced information can be a picture having the same field of view as that of the optical image obtained through the objective lens, which is used to enhance/improve display of the optical image. For example, when there is thin cloud in the sky and visibility is lower than that of clear sky, some stars are supposed to be seen but disappear. In such a case, the stars that disappear can be compensated by a picture which is corresponding to the optical image of the real stars, by superposing the picture on the optical image of the stars, and presenting them together to a user. Thus, the user can see an image with more detailed astronomical information.

Figure 8:
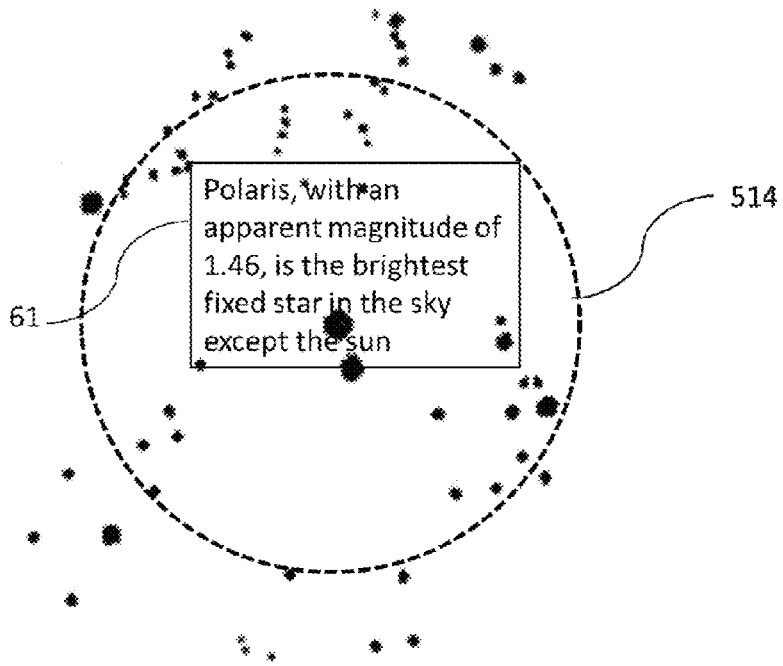
FIG. 8 shows an example of a hybrid image.
Figure 9:
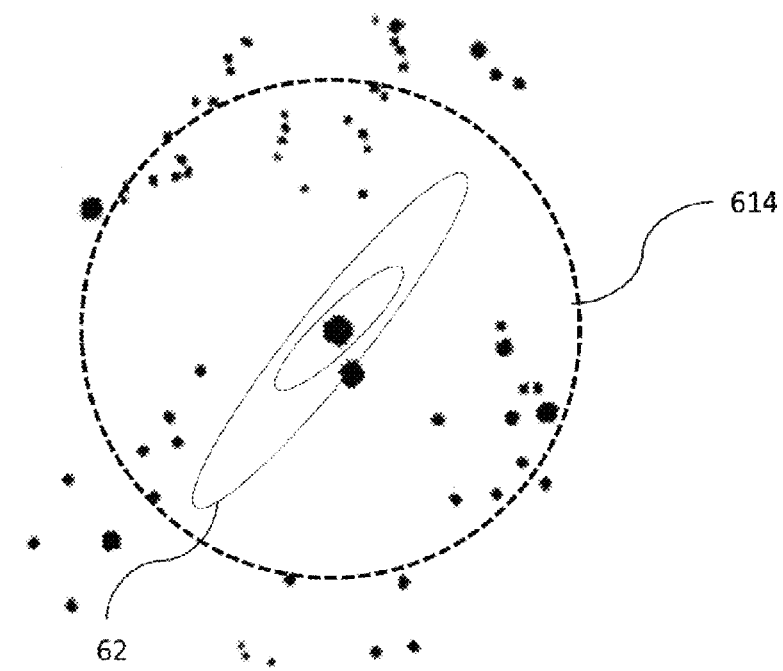
FIG. 9 shows another example of a hybrid image.
Figure 10:
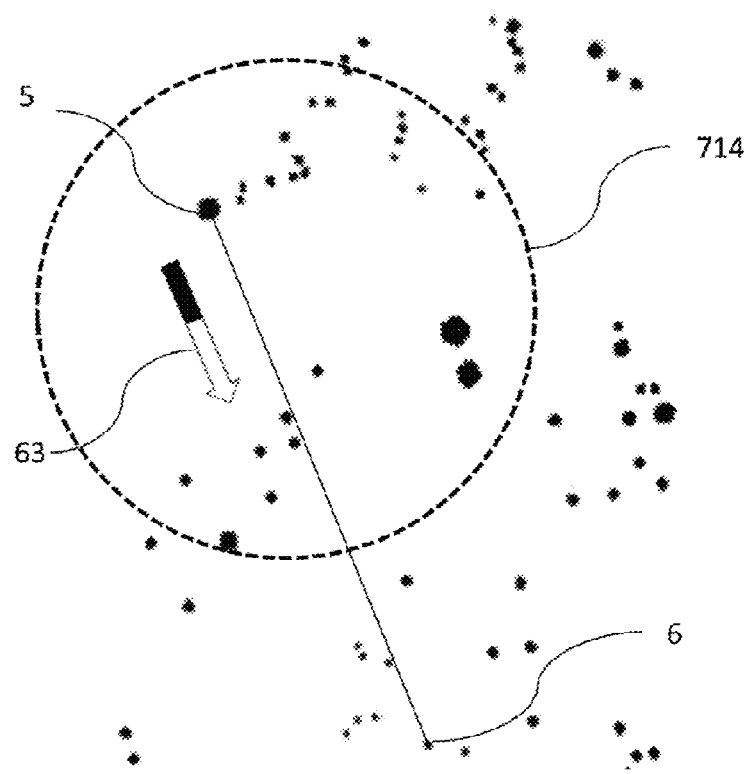
FIG. 10 shows yet another example of a hybrid image.

FIG. 8 to FIG. 10 show examples of hybrid images with different enhanced information. Specifically, FIG. 8 is an illustration of a hybrid image comprising an optical image 514 and enhanced information 61. In the example shown in FIG. 8, the enhanced information 61 comprises introduction to stars in the optical image 514. FIG. 9 is an illustration of a hybrid image comprising an optical image 614 and enhanced information 62. In the example shown in FIG. 9, the enhanced information 62 comprises an existing picture processed to have the same field of view as that of the optical image 614, showing celestial body not observed in the optical image 614 (for example, illustration of a nebula as shown in FIG. 9), and thus embellishing and/or supplementing the optical image 614. FIG. 10 is an illustration of a hybrid image comprising an optical image 714 and enhanced information 63. In the example of FIG. 10, the enhanced information 63 comprises an arrow icon indicating a direction, along which the optical image 714 can be adjusted from a field of view showing a start star 5 to another field of view showing a target star 6. In addition, a length of the arrow icon can be filled with a particular color so as to indicate progress of the adjustment.

By superposing a picture with enhanced information on an optical image imaged by the IT-based astronomical telescope system 1, richer astronomical knowledge and/or guiding information related to adjustment of the telescope system can be presented to a user, which provides a convenient way for the user to learn astronomical knowledge and/or to learn how to use and adjust an astronomical telescope, and improves display effect of the IT-based astronomical telescope, thereby increasing the user's interest in using it.

The IT-based astronomical telescope system 1 according to the third embodiment can not only work in the above hybrid image mode, but also in the optical imaging mode in which the image generator 13 is turned off, or in the virtual reality mode in which the image generator 13 is turned on and the IT-based astronomical telescope system 1 is set in a state of not imaging through the objective lens, for example when being placed in a dark room.

Figure 11:
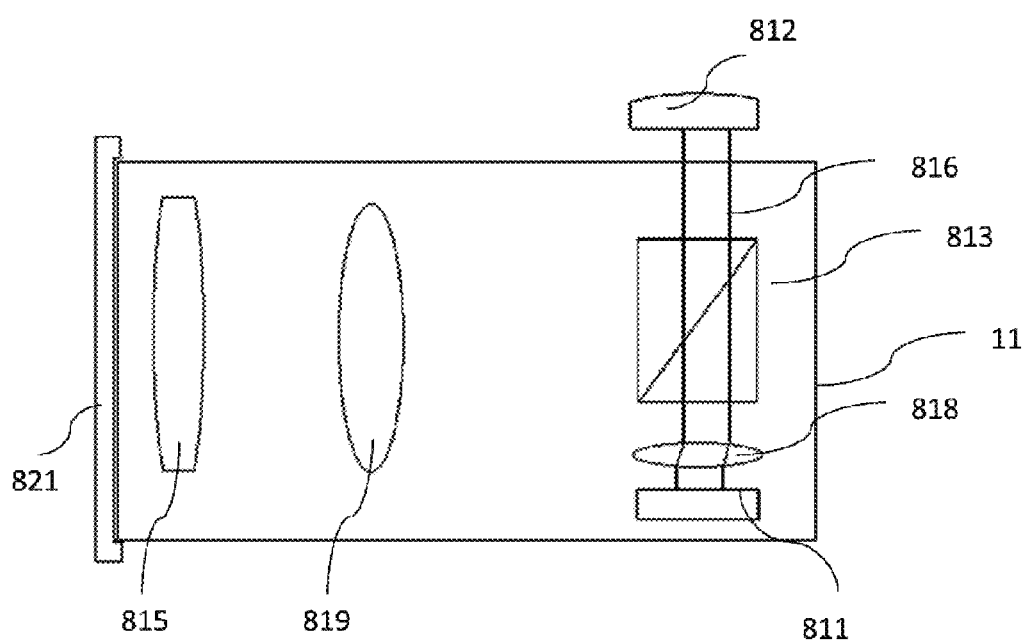
FIG. 11 is an illustration of an IT-based astronomical telescope system according to a fourth embodiment.

FIG. 11 is an illustration of an IT-based astronomical telescope system according to a fourth embodiment. For clarity and conciseness, only configuration of the lens barrel 11 is shown. The lens barrel 11 of the fourth embodiment shown in FIG. 11 comprises a micro display 811 (which is a part of an image generator 13 shown in FIG. 1), a first relay lens 818, a light combining element 813, an objective lens 815, a second relay lens 819, and an eyepiece 812. The configuration of the lens barrel 11 of the fourth embodiment shown in FIG. 11 is similar to that of the lens barrel 11 shown in FIG. 6. Difference between the two lies in that the IT-based astronomical telescope system 1 according to the fourth embodiment further comprises a first light blocking device 821 for blocking light in the optical imaging path which passes the objective lens 815 and is in the upstream of the light combining element 813. In the example shown in FIG. 11, the first light blocking device 821 is positioned on the outer side of the objective lens 815 so that it can be operated to prevent light from entering into the lens barrel 11 from outside.

When the first light blocking device 821 is operated to block light in the optical path, the IT-based astronomical telescope system 1 is switched into a virtual reality mode. In the virtual reality mode, as shown in FIG. 11, along an optical imaging path 816, a picture displayed on the micro display 811 is imaged through the first relay lens 818, the light combining element 813 and the eyepiece 812 and presented to a user. In this case, only the picture displayed on the micro display 811 can be observed by a user through the eyepiece 812.

The first light blocking device 821 can be a mechanical light blocking device, such as a lens cover provided on the outer side of the objective lens 815. Optionally, the first light blocking device 815 can be an electronic light blocking device as well. The first light blocking device 815 can be provided on the outer side of (or in other words, in the upstream of) the objective lens 815, or at any position in the optical path between the objective lens 815 and the light combining element 813.

The electronic light blocking device can be operated automatically or manually.

When the electronic light blocking device is operated automatically, a first photoelectric sensor (not shown) may be provided to cooperate with it. The first photoelectric sensor can be provided near an end of the lens barrel 11 of the IT-based astronomical telescope system 1 toward stars, to sense light intensity outside the end of the lens barrel 11 toward the stars. Just as an example, when the light intensity detected by the first photoelectric sensor is greater than a first threshold, the first light blocking device 821 automatically blocks the light. At this time, in case that the image generator 13 is turned on, the IT-based astronomical telescope system 1 can be automatically switched into a virtual reality mode. When the light intensity is lower than the first threshold, the first light blocking device 821 can be automatically operated to not block light, which may automatically switch the IT-based astronomical telescope system 1 into an optical imaging mode (in case that the image generator 13 is turned off) or a hybrid image mode (in case that the image generator 13 is turned on).

Figure 12:
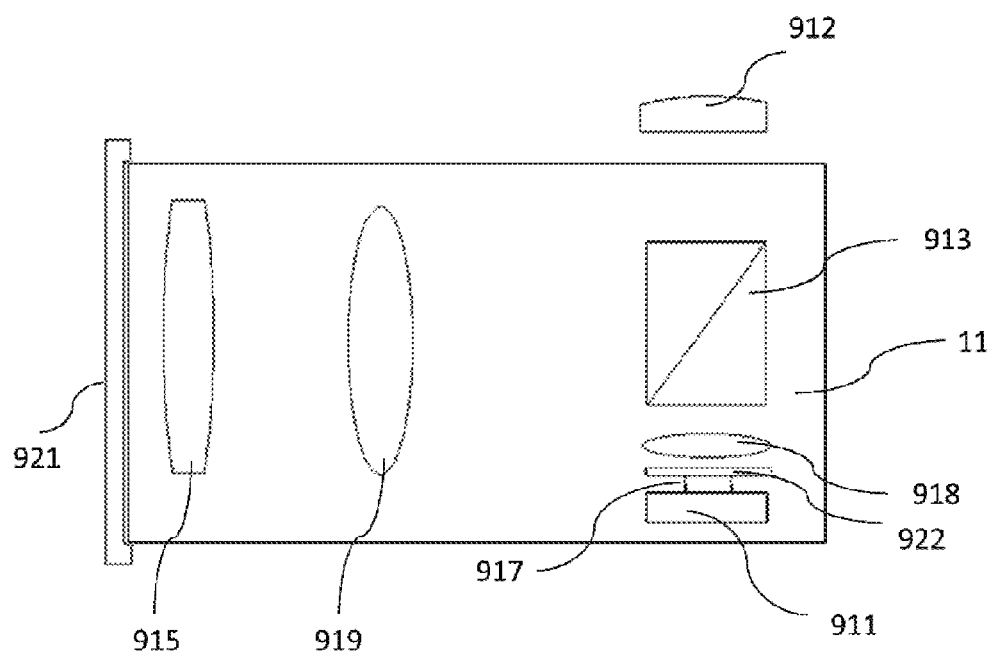
FIG. 12 is an illustration of an IT-based astronomical telescope system according to a fifth embodiment.

FIG. 12 is an illustration of an IT-based astronomical telescope system according to a fifth embodiment. For clarity and conciseness, only configuration of the lens barrel 11 is shown. The IT-based astronomical telescope system according to the fifth embodiment shown in FIG. 12 is similar to the system according to the fourth embodiment shown in FIG. 11, except that the system according to the fifth embodiment comprises not only a first light blocking device 921, but also a second light blocking device 922. The second light blocking device 922 is used to prevent light emitted by the micro display 911 from entering into eyepiece 912, if needed. It can be provided between the micro display 911 and a light combining element 913. As an example, the second light blocking device 922 can be provided between the micro display 911 and the first relay lens 918 so as to block light when the image generator 13 is in the course of getting started or being tested. This will prevent users from noticing the existence of the micro display 911 in the telescope system and thus improves experience of users.

As an example, the second light blocking device 922 can be an electronic light blocking device, which is provided in front of the micro display 911. The lens barrel 11 can further comprise a second photoelectric sensor (not shown in FIG. 12) to cooperate with the second light blocking device 922. The second photoelectric sensor is used to sense the intensity of light emitted by the micro display 911, and is provided between the micro display 911 and the second light blocking device 922. When the image generator 13 is turned on, and the second photoelectric sensor senses that the light intensity is less than a second threshold, the second light blocking device 922 will automatically switch into a state of not blocking light, and when the light intensity is greater than the second threshold, automatically switch into a state of blocking light. Thus, when the detected light intensity is strong, for example, when the image generator 13 is in the course of getting started or being tested, light from the display is prevented from entering users' eyes.

As another example, IT-based astronomical telescope system can further comprise a control circuit, which can control to turn on the micro display 911 after the image generator 13 has been turned on, so as to provide the same function of preventing light emitted by the micro display 911 from entering into eyepiece 912 as provided by a second light blocking device 922 in form of an electronic light blocking device.

The second light blocking device 922 in the fifth embodiment may be incorporated into the first to third embodiments shown in FIGS. 2, 4 and 6 as well.

The above description is only about preferable embodiments of the present application and explanation of applied technical principles. Those skilled in the art should understand that scope of the invention involved in the present application is not limited to technical solutions comprising a specific combination of the above technical features, but further comprises other technical solutions comprising an arbitrary combination of the above technical features or their equivalent features without departing from the inventive concept, for example, a technical solution obtained by replacing the above features with (but not limited to) technical features of similar functions disclosed in the present application.

What is claimed is:

1. An IT-based astronomical telescope system, comprising:
a rotatable lens barrel having an eyepiece installed thereon;
a detection device for detecting a current orientation of the lens barrel; and
an image generator comprising a micro display provided in the lens barrel, wherein the image generator is used to obtain a picture and display the picture on the micro display,
wherein, the IT-based astronomical telescope system is configured to work in a virtual reality mode, in which: the image generator is turned on, and based on the current orientation of the lens barrel detected by the detection device, obtains a picture which is corresponding to an optical image of stars supposed to be imaged by the IT-based astronomical telescope system with the current orientation of the lens barrel; and the micro display displays the picture, which is presented through the eyepiece of the IT-based astronomical telescope system with the current orientation of the lens barrel.

2. The IT-based astronomical telescope system according to claim 1, wherein the image generator obtains the picture from one or more selected from a group consisted of a local astronomical information database, an astronomical information database connected with the IT-based astronomical telescope system via Internet, and another astronomical telescope connected with the IT-based astronomical telescope system.

3. The IT-based astronomical telescope system according to claim 1, further comprising an objective lens for providing an optical image of stars to the eyepiece with the current orientation of the lens barrel.

4. The IT-based information astronomical telescope system according to claim 3, wherein the IT-based astronomical telescope system is further configured to work in an optical imaging mode, in which: the image generator is turned off, and only the optical image of stars is presented through the eyepiece.

5. The IT-based astronomical telescope system according to claim 3, wherein the IT-based astronomical telescope system further comprises a light combining element for combining a first optical imaging path along which the picture displayed on the micro display is presented through the eyepiece with a second optical imaging path along which the optical image of stars is presented through the eyepiece.

6. The IT-based astronomical telescope system according to claim 5, wherein the IT-based astronomical telescope system is further configured to work in a hybrid image mode, in which: the image generator is turned on and generates a picture with enhanced information, and the micro display displays the picture with enhanced information, which is presented through the eyepiece together with the optical image of stars.

7. The IT-based astronomical telescope system according to claim 5, wherein the IT-based astronomical telescope system is further configured to work in a hybrid image mode, in which: the image generator obtains an existing picture from an astronomical information database, which is corresponding to an optical image of stars supposed to be obtained by the IT-based astronomical telescope system with the current orientation of the lens barrel, and generates a picture with enhanced information based on the existing picture; and the micro display displays the picture with enhanced information, which is presented through the eyepiece together with the optical image of stars.

8. The IT-based astronomical telescope system according to claim 5, wherein the IT-based astronomical telescope system is configured to switch among the virtual reality mode, an optical imaging mode for providing an optical image of stars, and a hybrid image mode for providing both an optical image of stars and a picture with enhanced information.

9. The IT-based astronomical telescope system according to claim 1, wherein the local astronomical information database has photos and/or pictures of stars in the entire sky coverage or part of it stored therein.

10. The IT-based astronomical telescope system according to claim 6, wherein the enhanced information comprises one or more selected from a group consisted of information for guiding adjustment of the IT-based astronomical telescope system, astronomical knowledge related to the optical image of stars, and a figure showing celestial body not observed in the optical image.

11. The IT-based astronomical telescope system according to claim 8, further comprising a first light blocking device, which can be operated to block light in the second optical imaging path and is in the upstream of the light combining element.

12. The IT-based astronomical telescope system according to claim 11, wherein the first light blocking device is a lens barrel cover, which is provided at an end of the lens barrel of the IT-based astronomical telescope system toward stars.

13. The IT-based astronomical telescope system according to claim 11, wherein in the virtual reality mode, the first light blocking device blocks light in the second optical imaging path; and in the optical imaging mode and the hybrid image mode, the first light blocking device allows light to pass in the second optical imaging path.

14. The IT-based astronomical telescope system according to claim 13, further comprising a first photoelectric sensor provided near the end of the lens barrel of the IT-based astronomical telescope system toward stars, for detecting light intensity outside the lens barrel,
wherein the first light blocking device is an electronic light blocking device provided in the second optical imaging path, and when the light intensity detected by the first photoelectric sensor is greater than a first threshold, the first light blocking device is operated automatically to block light in the second optical imaging path.

15. The IT-based astronomical telescope system according to claim 1, further comprising:
a second light blocking device, which is an electronic light blocking device provided in front of the micro display; and
a second photoelectric sensor provided between the micro display and the second light blocking device for detecting intensity of light emitted by the micro display,
wherein when the micro display is turned on and the intensity detected by the second photoelectric sensor is less than a second threshold, the second light blocking device automatically switches into a state of not blocking light; and
when the light intensity detected by the second photoelectric sensor is greater than the second threshold, the second light blocking device automatically switches into a state of blocking light.

16. The IT-based astronomical telescope system according to claim 1, further comprising a second light blocking device, which is an electronic light blocking device provided in front of the micro display,
wherein the second light blocking device switches into a state of blocking light when the micro display is turned off, and switches into a state of not blocking light after the image generator has been turned on for a predetermined period of time.

17. The IT-based astronomical telescope system according to claim 1, further comprising a control circuit, which controls to turn on the micro display after the image generator has been turned on.

18. The IT-based astronomical telescope system according to claim 1, wherein the mage generator processes the picture, based on parameters of the obtained picture and parameters of the IT-based astronomical telescope system, to make the picture being of the same field of view as the optical image of stars supposed to be imaged by the telescope system.

* * * * *